(12) United States Patent
Ogawa

(10) Patent No.: US 8,925,690 B2
(45) Date of Patent: Jan. 6, 2015

(54) DISC BRAKE APPARATUS

(75) Inventor: Masaharu Ogawa, Toyota (JP)

(73) Assignee: Advics Co., Ltd, Kariya, Aichi-Pref. (JP)

( * ) Notice: Subject to any disclaimer, the term of this patent is extended or adjusted under 35 U.S.C. 154(b) by 137 days.

(21) Appl. No.: 13/576,580

(22) PCT Filed: May 19, 2011

(86) PCT No.: PCT/JP2011/061501
§ 371 (c)(1),
(2), (4) Date: Aug. 1, 2012

(87) PCT Pub. No.: WO2011/145678
PCT Pub. Date: Nov. 24, 2011

(65) Prior Publication Data
US 2012/0298457 A1    Nov. 29, 2012

(30) Foreign Application Priority Data

May 20, 2010   (JP) ................. 2010-116773

(51) Int. Cl.

| | |
|---|---|
| *F16D 65/38* | (2006.01) |
| *F16D 65/097* | (2006.01) |
| *F16D 65/095* | (2006.01) |
| F16D 121/02 | (2012.01) |
| F16D 55/00 | (2006.01) |

(52) U.S. Cl.
CPC .......... *F16D 65/095* (2013.01); *F16D 2121/02* (2013.01); *F16D 2055/007* (2013.01); *F16D 65/0977* (2013.01); *F16D 2055/0091* (2013.01)
USPC ............... 188/73.39; 188/73.31; 188/73.1; 188/73.45

(58) Field of Classification Search
CPC .............................. F16D 65/38; F16D 55/228
USPC ............ 188/250 B, 250 G, 73.38–73.47, 201, 188/73.1
See application file for complete search history.

(56) References Cited

U.S. PATENT DOCUMENTS 3,285,371 A * 11/1966 Cadiou ...................... 188/73.32
3,384,203 A *  5/1968 Walther et al. ............. 188/73.32
(Continued)

FOREIGN PATENT DOCUMENTS

DE   10 2010 003 118 A1   10/2010
EP        0 563 689 A2    10/1993
(Continued)

OTHER PUBLICATIONS

International Search Report (PCT/ISA/210) issued on Aug. 9, 2011, by the Japanese Patent Office as the International Searching Authority for International Application No. PCT/JP2011/061501.

(Continued)

*Primary Examiner* — Robert A Siconolfi
*Assistant Examiner* — James Hsiao
(74) *Attorney, Agent, or Firm* — Buchanan Ingersoll & Rooney PC

(57) ABSTRACT

A back plate is biased radially inward of a disc rotor by a spring, engaged at two locations on a torque reception surface with a caliper support shaft, and engaged at one location on a torque reception surface with a caliper support shaft. Inner and outer shims are disposed toward a back plate and pistons, respectively, and a friction factor between the back plate and the inner shim and that between the pistons and the outer shim are higher than that between the inner and outer shims. The inner shim is movable with the back plate in radial and circumferential directions and is movable relative to the back plate in the axial direction, and the outer shim is movable with the back plate in radial and circumferential directions, is movable relative to the back plate in the axial direction, and is rotatable about the radially inner support shaft axis.

6 Claims, 13 Drawing Sheets

(56) References Cited

U.S. PATENT DOCUMENTS

| | | | |
|---|---|---|---|
| 3,491,647 A * | 1/1970 | Frazier | 411/532 |
| 4,056,174 A * | 11/1977 | Wienand et al. | 188/73.36 |
| 4,200,173 A * | 4/1980 | Evans et al. | 188/73.45 |
| 4,463,837 A * | 8/1984 | Courbot | 188/73.38 |
| 4,476,962 A * | 10/1984 | Bofill | 188/71.1 |
| 4,498,564 A * | 2/1985 | Tamura | 188/73.32 |
| 4,511,019 A * | 4/1985 | Marianu | 188/72.2 |
| 4,515,249 A * | 5/1985 | Escarabajal et al. | 188/73.38 |
| 4,527,669 A * | 7/1985 | Meyer et al. | 188/73.38 |
| 4,533,025 A * | 8/1985 | Carre | 188/73.44 |
| 4,570,759 A * | 2/1986 | Ferret Bofill et al. | 188/73.32 |
| 4,836,339 A * | 6/1989 | Kobayashi et al. | 188/73.1 |
| 4,944,371 A * | 7/1990 | Giorgetti | 188/73.39 |
| 5,060,766 A * | 10/1991 | Kondo | 188/73.39 |
| 5,103,939 A * | 4/1992 | Schroeter | 188/72.4 |
| D337,981 S * | 8/1993 | Steinke et al. | D12/180 |
| 5,263,555 A * | 11/1993 | Imponente et al. | 188/73.34 |
| 5,284,227 A * | 2/1994 | Pelfrey | 188/71.1 |
| 5,289,903 A * | 3/1994 | Nagai et al. | 188/71.7 |
| 5,320,200 A * | 6/1994 | Hashimoto | 188/250 E |
| 5,323,882 A * | 6/1994 | Waterman et al. | 188/73.1 |
| 5,343,985 A * | 9/1994 | Thiel et al. | 188/72.5 |
| D354,265 S * | 1/1995 | Steinke et al. | D12/180 |
| D356,988 S * | 4/1995 | Steinke et al. | D12/180 |
| D357,662 S * | 4/1995 | Steinke et al. | D12/180 |
| 5,464,077 A * | 11/1995 | Thiel et al. | 188/72.5 |
| D368,460 S * | 4/1996 | Steinke et al. | D12/180 |
| 5,509,508 A * | 4/1996 | Evans | 188/73.38 |
| 5,515,948 A * | 5/1996 | Gilliland | 188/72.5 |
| 5,620,063 A * | 4/1997 | Smith | 188/73.2 |
| 5,810,121 A * | 9/1998 | Anger et al. | 188/72.5 |
| 5,829,555 A * | 11/1998 | Anda et al. | 188/73.38 |
| 5,975,252 A * | 11/1999 | Suzuki et al. | 188/73.1 |
| D423,909 S * | 5/2000 | Hartin | D8/349 |
| 6,170,620 B1 * | 1/2001 | Akita et al. | 188/251 A |
| 6,206,147 B1 * | 3/2001 | Yoshida et al. | 188/73.36 |
| 6,250,440 B1 * | 6/2001 | Mery et al. | 188/73.44 |
| 6,257,379 B1 * | 7/2001 | Matsumoto et al. | 188/73.31 |
| 6,296,085 B1 * | 10/2001 | Yukoku | 188/73.36 |
| 6,340,076 B1 * | 1/2002 | Tsuchiya | 188/73.45 |
| 6,357,559 B1 * | 3/2002 | Madzgalla et al. | 188/73.32 |
| 6,427,810 B2 * | 8/2002 | Schorn et al. | 188/73.39 |
| 6,481,545 B1 * | 11/2002 | Yano et al. | 188/264 G |
| 6,957,724 B2 * | 10/2005 | Gherardi et al. | 188/73.38 |
| 7,007,778 B2 * | 3/2006 | Lavezzi | 188/73.31 |
| 7,014,018 B2 * | 3/2006 | Beringer | 188/73.45 |
| 7,201,258 B2 * | 4/2007 | Schog et al. | 188/73.45 |
| 7,370,736 B2 * | 5/2008 | Anda et al. | 188/73.36 |
| 7,438,161 B2 * | 10/2008 | Burgoon et al. | 188/73.32 |
| 7,481,304 B2 * | 1/2009 | Tsurumi et al. | 188/73.36 |
| 7,726,450 B2 * | 6/2010 | Bosco, Jr. | 188/250 G |
| 7,757,822 B2 * | 7/2010 | Reeves | 188/72.5 |
| 7,828,123 B2 * | 11/2010 | Ruopp | 188/73.36 |
| 7,849,982 B1 * | 12/2010 | Tamura et al. | 188/250 G |
| 7,926,627 B2 * | 4/2011 | Wake et al. | 188/73.37 |
| 8,225,911 B2 * | 7/2012 | Lin et al. | 188/73.37 |
| D688,609 S * | 8/2013 | Arbesman et al. | D12/180 |
| D688,610 S * | 8/2013 | Arbesman et al. | D12/180 |
| D688,996 S * | 9/2013 | Arbesman et al. | D12/180 |
| D688,997 S * | 9/2013 | Arbesman et al. | D12/180 |
| D688,998 S * | 9/2013 | Arbesman et al. | D12/180 |
| D691,075 S * | 10/2013 | Magaard | D12/180 |
| 8,544,614 B1 * | 10/2013 | Plantan et al. | 188/73.32 |
| 8,544,618 B2 * | 10/2013 | Klimt et al. | 188/250 F |
| 8,556,046 B2 * | 10/2013 | Ciotti et al. | 188/250 G |
| 8,662,261 B2 * | 3/2014 | Raffin et al. | 188/73.32 |
| 2003/0213658 A1 * | 11/2003 | Baba | 188/73.37 |
| 2004/0154885 A1 | 8/2004 | Gotti et al. | |
| 2004/0163903 A1 * | 8/2004 | Saka | 188/250 G |
| 2004/0188190 A1 * | 9/2004 | Niwa et al. | 188/73.37 |
| 2005/0194223 A1 * | 9/2005 | Murayama | 188/73.38 |
| 2006/0027427 A1 * | 2/2006 | Anda et al. | 188/73.1 |
| 2006/0049008 A1 * | 3/2006 | Kinoshita et al. | 188/73.39 |
| 2008/0128224 A1 | 6/2008 | Ruopp | |
| 2009/0000880 A1 * | 1/2009 | Noguchi et al. | 188/71.7 |
| 2009/0223753 A1 * | 9/2009 | Kappagantu et al. | 188/73.37 |
| 2010/0078269 A1 * | 4/2010 | Tokunaga et al. | 188/73.46 |
| 2010/0084227 A1 * | 4/2010 | Lin et al. | 188/73.37 |
| 2010/0140029 A1 * | 6/2010 | Parild et al. | 188/73.37 |
| 2010/0243384 A1 | 9/2010 | Morita et al. | |
| 2010/0326776 A1 * | 12/2010 | Tamura et al. | 188/72.1 |
| 2011/0180359 A1 * | 7/2011 | Latifi et al. | 188/234 |
| 2012/0073915 A1 * | 3/2012 | Kahan et al. | 188/73.37 |
| 2013/0068574 A1 * | 3/2013 | Arbesman | 188/73.37 |

FOREIGN PATENT DOCUMENTS

| | | |
|---|---|---|
| EP | 1 571 364 A1 | 9/2005 |
| EP | 2194288 A2 | 6/2010 |
| JP | 11-101280 A | 4/1999 |
| JP | 2008-527272 A | 7/2005 |
| JP | 2005-249114 A | 9/2005 |
| JP | 2006-046561 A | 2/2006 |
| JP | 2008-256131 A | 10/2008 |
| JP | 2009-085282 A | 4/2009 |
| JP | 2009-103144 A | 5/2009 |
| JP | 2010-019303 A | 1/2010 |

OTHER PUBLICATIONS

Written Opinion (PCT/ISA/237) issued on Aug. 9, 2011, by the Japanese Patent Office as the International Searching Authority for International Application No. PCT/JP2011/061501.

Office Action from the German Patent Office dated Oct. 8, 2014, issued in corresponding German Patent Application No. 11 2011 101 716.2, with English translation thereof. (18 pages).

* cited by examiner (a)

(b)

DISC BRAKE APPARATUS

TECHNICAL FIELD

The present invention relates to a disc brake apparatus, and more particularly to a disc brake apparatus including a disc rotor which is attached to a rotating member (e.g., an axle hub) and rotates unitarily with the rotating member, a caliper attached to a support body (e.g., a vehicle body) in such a manner as to straddle a partial circumference of the disc rotor, a pair of brake pads disposed in such a manner as to be able to nip the disc rotor and supported, via support shafts, by the caliper in such a manner as to be movable in the axial direction of the disc rotor, and pistons attached to the caliper and adapted to press the brake pads toward the disc rotor; and configured such that the pistons press back plates of the brake pads, whereby the linings of the brake pads are slidably pressed against the braking surfaces of the disc rotor, thereby braking the disc rotor.

BACKGROUND ART

In a disc brake apparatus of such a type described in, for example, Patent Document 1 mentioned below, the brake pads are supported by the caliper in such a manner as to be movable in the axial direction of the disc rotor, by means of a single radially inner support shaft provided unitarily with the caliper and engaged with radially inner engagement surfaces of the back plates provided at positions corresponding to radially inner, circumferentially central portions of the linings with respect to the radial and circumferential directions of the disc rotor, and a single radially outer support shaft provided unitarily with the caliper and extending through the through holes of the back plates' arms extending radially outward with respect to the radial direction of the disc rotor and located toward the leading side of the linings; and the brake pads are supported by the caliper in such a manner as to be movable in the axial direction of the disc rotor, by means of torque reception surfaces (planes) formed on the caliper and engaged with respective end surfaces (planes) formed on the back plates and located toward the trailing side of the linings.

PRIOR ART DOCUMENT

Patent Document

[Patent Document 1] PCT Application Laid-Open No. 2008-527272

SUMMARY OF THE INVENTION

In the disc brake apparatus described in Patent Document 1 mentioned above, torque associated with braking is received mainly by the torque reception surfaces (planes) which are formed on the caliper and engaged with the respective end surfaces (planes) formed on end portions, located toward the trailing side of the linings with respect to the circumferential direction of the disc rotor, of the back plates. The torque reception surfaces (planes) are such unstable planes as to easily vary in geometry according to an engagement relation between the radially inner support shaft and the radially inner engagement surfaces of the back plates (manufacturing errors, assembly errors, or thermal expansion of the members) or the like, and thus involve difficulty in planar engagement with the end surfaces (planes) of the back plates. Therefore, during braking, the brake pads may behave unstably, and associated brake noise may be produced. Also, the disc brake apparatus requires machining for forming the torque reception surfaces on the caliper and machining of the entire trailing-side end surfaces (planes) of the back plates; therefore, a machining area is large, resulting in an increase in cost.

In the disc brake apparatus described in Patent Document 1 mentioned above, since torque associated with braking is received by the torque reception surfaces (planes) which are engaged with the trailing-side end surfaces (the end surfaces located toward the trailing side of the linings) of the back plates, and the torque reception surfaces are located a great distance away from the leading-side ends (the ends located toward the leading side of the linings) of the back plates (a moment arm is long), the enfolding moments of the brake pads generated in braking are large (the enfolding moment is a rotation moment which is caused by the displacement, in the axial direction of the disc rotor, of the sliding surface between the disc rotor and the lining from a location of receiving torque associated with braking and which renders the leading-side surface pressure on the lining higher than the trailing side surface pressure on the lining). Therefore, the distribution of surface pressure on each of the linings against the disc rotor is inconsistent, unavoidably resulting in uneven wear of the linings in the circumferential direction of the rotor disc.

In order to solve the above problem, an applicant of the present application has proposed in Japanese Patent Application No. 2009-85282 a disc brake apparatus which comprises a disc rotor attached to a rotating member and rotating unitarily with the rotating member, a caliper attached to a support body in such a manner as to straddle a partial circumference of the disc rotor, a pair of brake pads disposed in such a manner as to be able to nip the disc rotor, and supported via a support shaft by the caliper in such a manner as to be movable in an axial direction of the disc rotor, and pistons attached to the caliper and adapted to press the brake pads toward the disc rotor, and which is configured such that the pistons press back plates of the brake pads, whereby linings of the brake pads are slidably pressed against braking surfaces of the disc rotor, thereby braking the disc rotor, the disc brake apparatus being characterized in that: the brake pads are biased inward with respect to a radial direction of the disc rotor by biasing members; the support shaft is composed of a single radially inner support shaft provided unitarily with the caliper and engaged with V-shaped radially inner torque reception surfaces of the back plates at two locations on each of the V-shaped radially inner torque reception surfaces, the V-shaped radially inner torque reception surfaces being located at positions corresponding to radially inner, circumferentially central portions of the linings with respect to radial and circumferential directions of the disc rotor, and a radially outer support shaft provided unitarily with the caliper and engaged with radially outer torque reception surfaces of the back plates at one location on each of the radially outer torque reception surfaces, the radially outer torque reception surfaces being located at positions corresponding to radially outer, circumferentially intermediate portions of the linings with respect to the radial and circumferential directions of the disc rotor; and the brake pads are attached to the radially inner support shaft in such a manner as to be rotatable by a predetermined amount about an axis of the radially inner support shaft.

The above-proposed disc brake apparatus can solve the above problem, but involves a problem that, in some cases, the production of brake noise in braking cannot be sufficiently solved; therefore, demand exists for further improvement. The present invention has been conceived to meet the demand and provides the above-mentioned disc brake apparatus further characterized in that: an inner shim and an outer shim intervene between each of the back plates and each of the pistons in such a manner that the inner and outer shims are disposed toward the back plate and the piston, respectively, and a friction coefficient between the back plate and the inner shim and a friction coefficient between the piston and the outer shim are higher than a friction coefficient between the inner shim and the outer shim; the inner shim is attached to the back plate in such a manner as to be movable unitarily with the back plate in the radial direction of the disc rotor and in the circumferential direction of the disc rotor, and to be movable relative to the back plate in the axial direction of the disc rotor; and the outer shim is attached to the back plate in such a manner as to be movable unitarily with the back plate in the radial direction of the disc rotor and in the circumferential direction of the disc rotor, to be movable relative to the back plate in the axial direction of the disc rotor, and to be rotatable by a predetermined amount about the axis of the radially inner support shaft.

The disc brake apparatus can also be configured as follows: the outer shim has a leading-side engagement tab to be engaged with a leading-side engagement surface formed on a leading-side end surface (a leading-side end surface when the disc rotor rotates forward), located on a leading side with respect to the circumferential direction of the disc rotor, of the back plate, a trailing-side engagement tab to be engaged with a trailing-side engagement surface formed on a trailing-side end surface (a trailing-side end surface when the disc rotor rotates forward), located on a trailing side with respect to the circumferential direction of the disc rotor, of the back plate, a radially outer engagement tab to be engaged with a radially outer engagement surface formed on a radially outer end surface, located on a radially outer side with respect to the radial direction of the disc rotor, of the back plate, and a radially inner engagement tab to be engaged with a radially inner engagement surface formed on a radially inner end surface, located on a radially inner side with respect to the radial direction of the disc rotor, of the back plate; the leading-side engagement surface, the trailing-side engagement surface, and the radially outer engagement surface of the back plate are formed into respective arc shapes about the axis of the radially inner support shaft; and in a state in which the radially outer support shaft restrains the back plate from tilting, toward the trailing side, on the radially inner support shaft and allows the back plate to tilt, toward the leading side, on the radially inner support shaft, the radially inner engagement tab of the outer shim is disengageably engaged with the radially inner engagement surface of the back plate.

The disc brake apparatus can also be configured as follows: the outer shim has a pair of radially outer engagement tabs to be engaged with a pair of radially outer engagement surfaces formed on the back plate on opposite sides, with respect to the circumferential direction of the disc rotor, of the radially outer torque reception surface; a pair of radially inner engagement tabs to be engaged with a pair of radially inner engagement surfaces formed on the back plate on opposite sides, with respect to the circumferential direction of the disc rotor, of the radially inner torque reception surface; and the pair of radially outer engagement surfaces and the pair of radially inner engagement surfaces formed on the back plate are formed into respective arc shapes about the axis of the radially inner support shaft.

In the above-mentioned disc brake apparatus of the present invention, torque associated with braking of the disc rotor is received at three locations on each of the brake pads; namely, at two engagement locations between the radially inner support shaft and the V-shaped radially inner torque reception surface of each of the brake pads and at one engagement location between the radially outer support shaft and the radially outer torque reception surface of each of the brake pads; therefore, as compared with the case where torque associated with braking is received by an unstable plane (e.g., as in the case of the above-mentioned disc brake apparatus of Patent Document 1), the behavior of the brake pads is stable. Accordingly, the production of brake noise associated with an unstable behavior of the brake pads in braking can be restrained. Also, as compared with the case where torque associated with braking is received by an unstable plane, the area of locations (the area of machining) which receive the torque can be reduced, whereby the machining cost can be reduced.

Also, in the disc brake apparatus of the present invention, the locations of receiving torque associated with braking correspond to radially inner, circumferentially central portions of the linings with respect to the radial and circumferential directions of the disc rotor, and to radially outer, circumferentially intermediate portions of the linings with respect to the radial and circumferential directions of the disc rotor; therefore, the locations are not a great distance away from the circumferential end surfaces of the linings with respect to the circumferential direction of the disc rotor (i.e., moment arms are short). Therefore, as compared with the disc brake apparatus of Patent Document 1 mentioned above, the enfolding moments of the brake pads generated in braking can be reduced; the distribution of surface pressure on each of the linings against the disc rotor can be uniform; and uneven wear of the linings in the circumferential direction of the rotor disc can be restrained.

Also, in the disc brake apparatus of the present invention, the inner shims are attached to the respective back plates in such a manner as to be movable unitarily with the back plates in the radial direction of the disc rotor and in the circumferential direction of the disc rotor, and to be movable relative to the back plates in the axial direction of the disc rotor; and the outer shims are attached to the respective back plates in such a manner as to be movable unitarily with the back plates in the radial direction of the disc rotor and in the circumferential direction of the disc rotor, to be movable relative to the back plates in the axial direction of the disc rotor, and to be rotatable by a predetermined amount about the axis of the radially inner support shaft. Therefore, in a nonbraking condition, the movement of the inner and outer shims relative to the back plates (shim vibration) can be restrained; accordingly, rattle noise caused by shim vibration can be restrained.

Also, according to the disc brake apparatus of the present invention, when, in braking, the back plates (brake pads) tilt on the radially inner support shaft, the outer shims (whose movements are restricted by the pistons) do not hinder the tilting of the back plates. Therefore, in braking, a predetermined relative movement can be established between the inner shims and the outer shims, and a brake-noise-preventing function as effected by the relative movement between the inner shims and the outer shims can be effectively exhibited.

The present invention can also be embodied as follows: the outer shim has a stopper which can be engaged with and disengaged from the radially outer support shaft, and, when the radially outer support shaft restrains the back plate from tilting, toward the trailing side, on the radially inner support shaft and allows the back plate to tilt, toward the leading side, on the radially inner support shaft, the stopper is engaged with the radially outer support shaft to restrain the outer shim from tilting toward the trailing side about the radially inner support shaft. In this case, external force, if any, can be prevented from causing the outer shim to tilt toward the trailing side about the radially inner support shaft. Therefore, the outer shim can be maintained in a predetermined condition relative to the back plate, thereby ensuring a smooth movement of the back plate when the back plate tilts, toward the leading side, on the radially inner support shaft.

In this case, the stopper can be plane-engaged with the radially outer support shaft. In this case, the stopper can be restrained from damaging the radially outer support shaft. Therefore, a smooth movement of the back plates along the radially outer support shaft (a smooth movement of the brake pads in the axial direction of the disc rotor) can be ensured over a long period of time.

MODES FOR CARRYING OUT THE INVENTION

Figure 1:
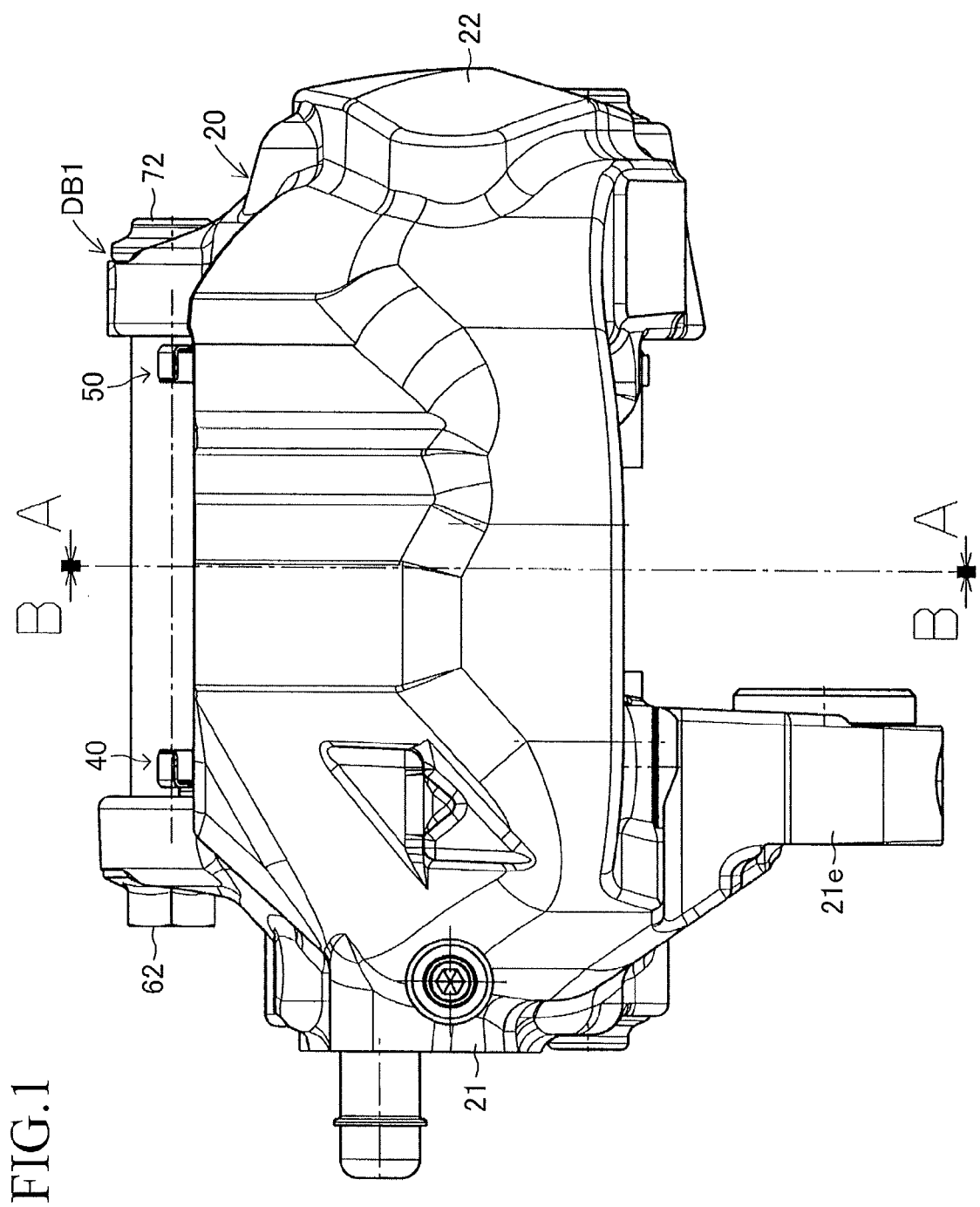
FIG. 1 is a side view showing an embodiment of a disc brake apparatus according to the present invention.

The embodiments of the present invention will next be described with reference to the drawings. FIGS. 1 to 6 show an embodiment of the present invention embodied in an opposed-piston type (stationary type) disc brake apparatus for a vehicle. A disc brake apparatus DB1 of the present embodiment includes a disc rotor 10 which is attached to an axle hub (an unillustrated rotating member) and rotates unitarily with a wheel (not shown); a caliper 20 disposed in such a manner as to straddle a partial circumference of the disc rotor 10; four pistons 31, 32, 33, and 34 attached to the caliper 20; an inner brake pad 40; an outer brake pad 50; an inner shim ISa and an outer shim ISb attached to the inner brake pad 40; and an inner shim OSa and an outer shim OSb attached to the outer brake pad 50. The disc brake apparatus DB1 further includes an inner radially-inner support shaft 61 and an inner radially-outer support shaft 62 provided on the caliper 20; an outer radially-inner support shaft 71 and an outer radially-outer support shaft 72 provided on the caliper 20; and plate springs 81 and 82.

Figure 2:
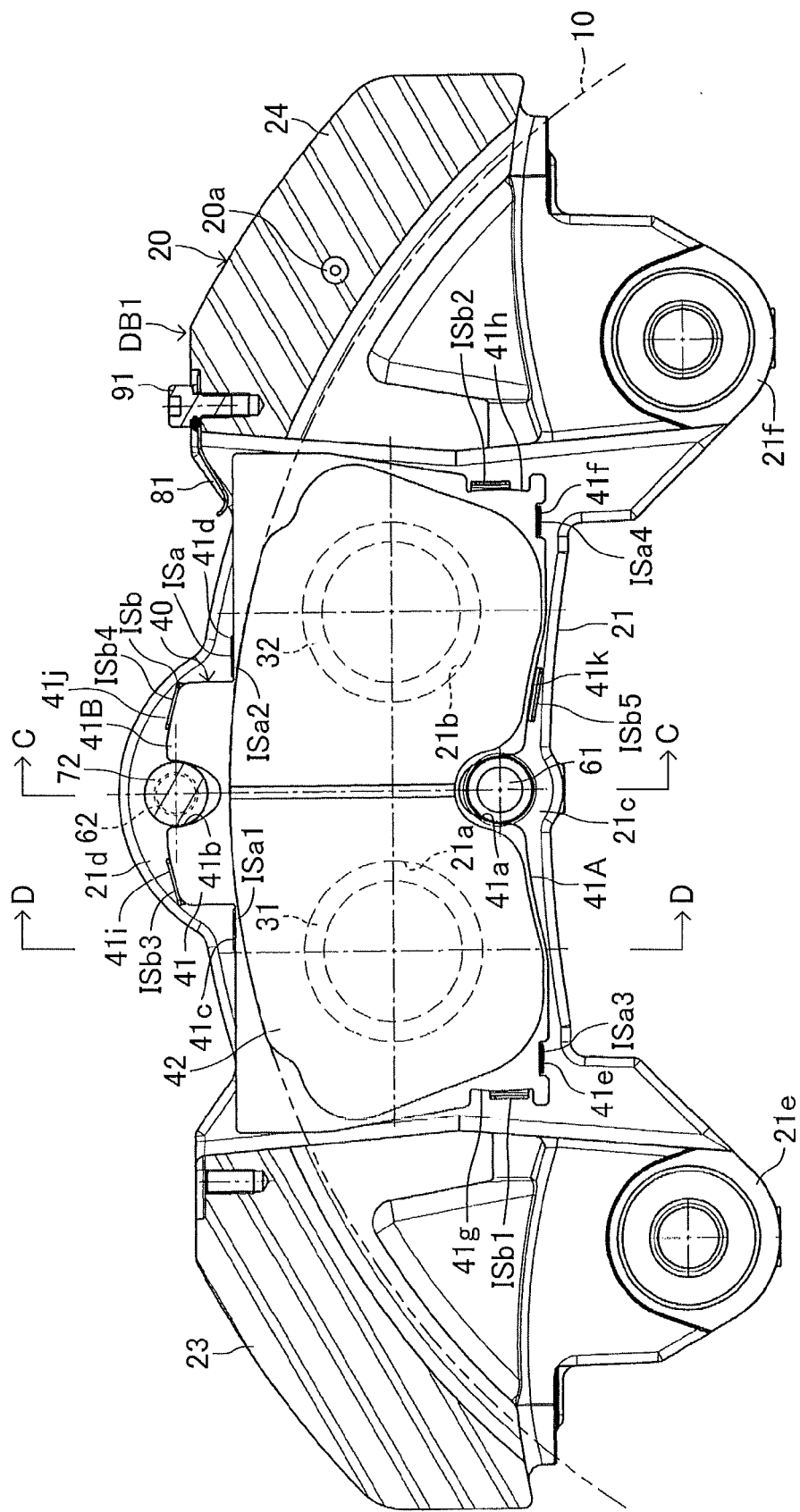
FIG. 2 is a sectional view taken along line A-A of FIG. 1.
Figure 4:
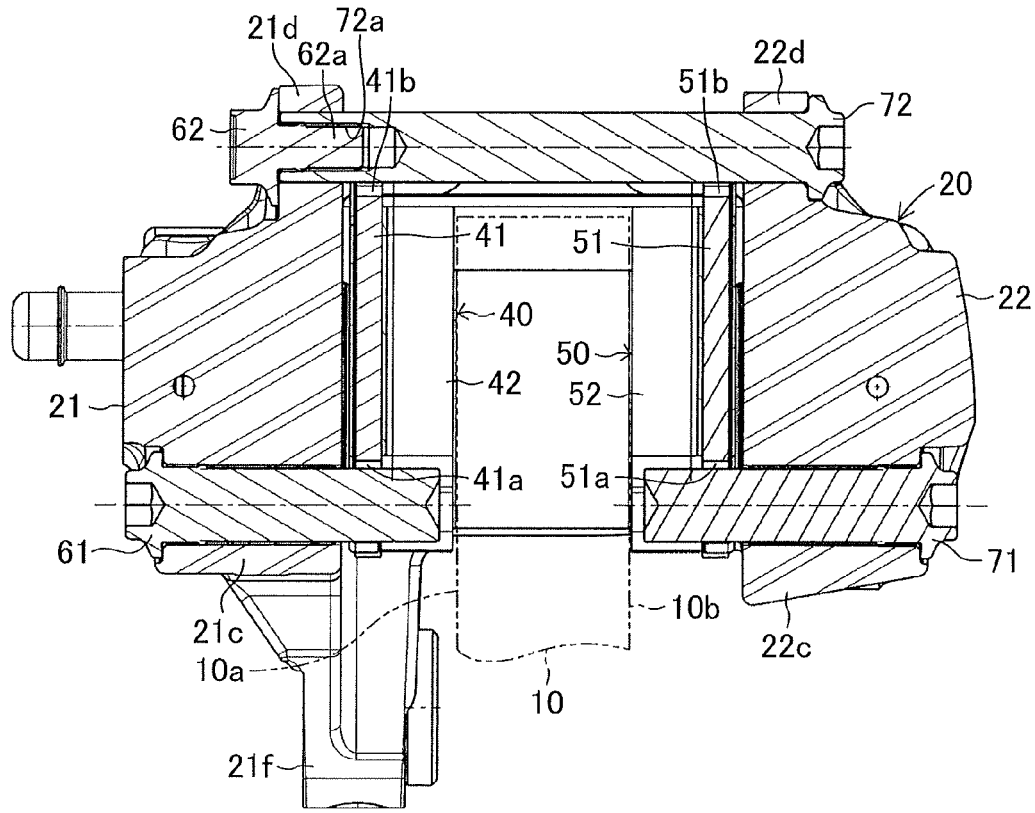
FIG. 4 is a sectional view taken along line C-C of FIG. 2.

As shown in FIG. 4, the disc rotor 10 has annular braking surfaces 10*a* and 10*b* which can be nipped between a lining 42 of the inner brake pad 40 and a lining 52 of the outer brake pad 50. In braking, the braking surfaces 10*a* and 10*b* are nipped between the lining 42 of the inner brake pad 40 and the lining 52 of the outer brake pad 50, whereby the rotation of the disc rotor 10 is braked. When the wheel rotates forward, the disc rotor 10 rotates unitarily with the wheel clockwise (forward) in FIG. 2; in this case, the left side of FIG. 2 is a leading side, and the right side of FIG. 2 is a trailing side.

As shown in FIGS. 1 to 6, the caliper 20 includes an inner housing portion 21 and an outer housing portion 22 which face each other in such a manner as to straddle a partial circumference of the disc rotor 10, and a pair of connection portions 23 and 24 for connecting the inner and outer housing portions 21 and 22. The inner housing portion 21 is disposed on the inner side of the disc rotor 10 and has a pair of cylinders 21*a* and 21*b* (see FIG. 2).

The inner housing portion 21 also has a support portion 21*c* for supporting the inner radially-inner support shaft 61 which is engaged with a V-shaped radially inner torque reception surface 41*a* provided at a radially inner, circumferentially central portion of a back plate 41 of the inner brake pad 40 with respect to the radial and circumferential directions of the disc rotor 10, and a support portion 21*d* for supporting the inner radially-outer support shaft 62 connected to an end portion of the outer radially-outer support shaft 72 which can be engaged with a V-shaped radially outer torque reception surface 41*b* provided at a radially outer, circumferentially central portion of the back plate 41 of the inner brake pad 40 with respect to the radial and circumferential directions of the disc rotor 10.

Figure 5:
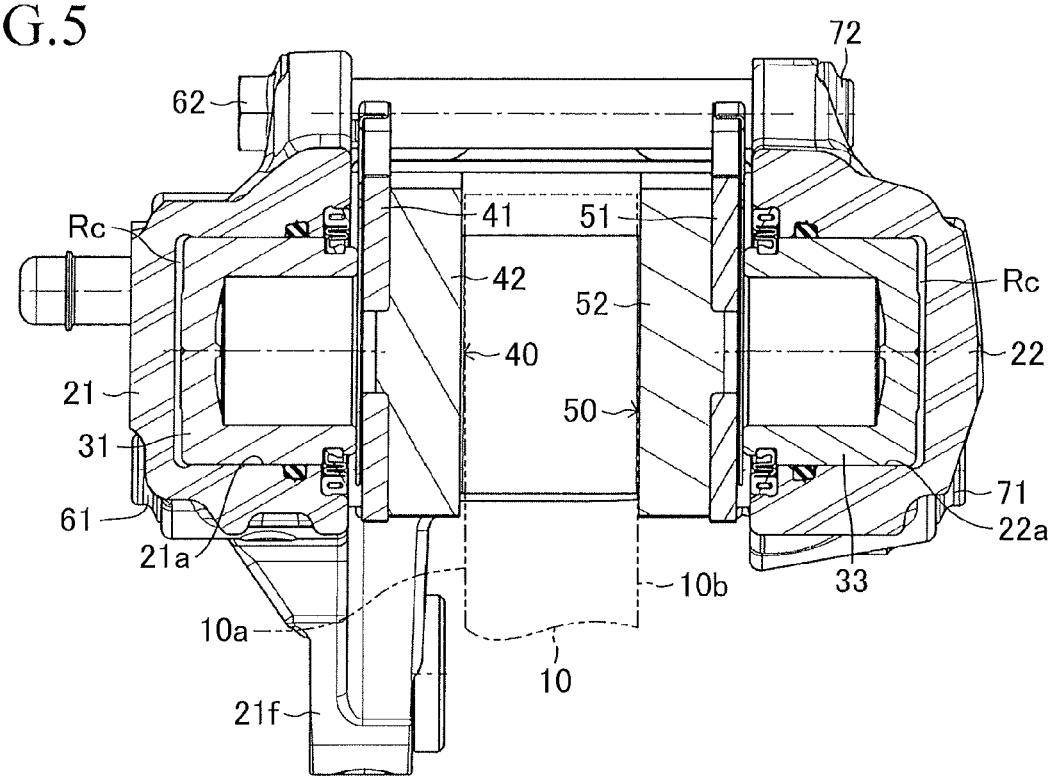
FIG. 5 is a sectional view taken along line D-D of FIG. 2.

The inner housing portion 21 also has a pair of mounting portions 21*e* and 21*f* extending radially inward, with respect to the radial direction of the disc rotor 10, from a radially inner end thereof, and is mounted to a vehicle body (a support body) by use of bolts (not shown). As shown in FIG. 2, the pair of cylinders 21*a* and 21*b* is disposed at a predetermined interval therebetween in the circumferential direction of the disc rotor 10. As shown in FIG. 5, the pair of cylinders 21*a* and 21*b* is formed in the axial direction of the disc rotor 10

The outer housing portion 22 is disposed on the outer side of the disc rotor 10; has a pair of cylinders 22*a* and 22*b* similar to the inner housing portion 21 having the pair of cylinders 21*a* and 21*b*; and has a support portion 22*c* for supporting the outer radially-inner support shaft 71, and a support portion 22*d* for supporting the outer radially-outer support shaft 72 (see FIG. 3), similar to the inner housing portion 21 having the support portions 21*c* and 21*d*.

Figure 3:
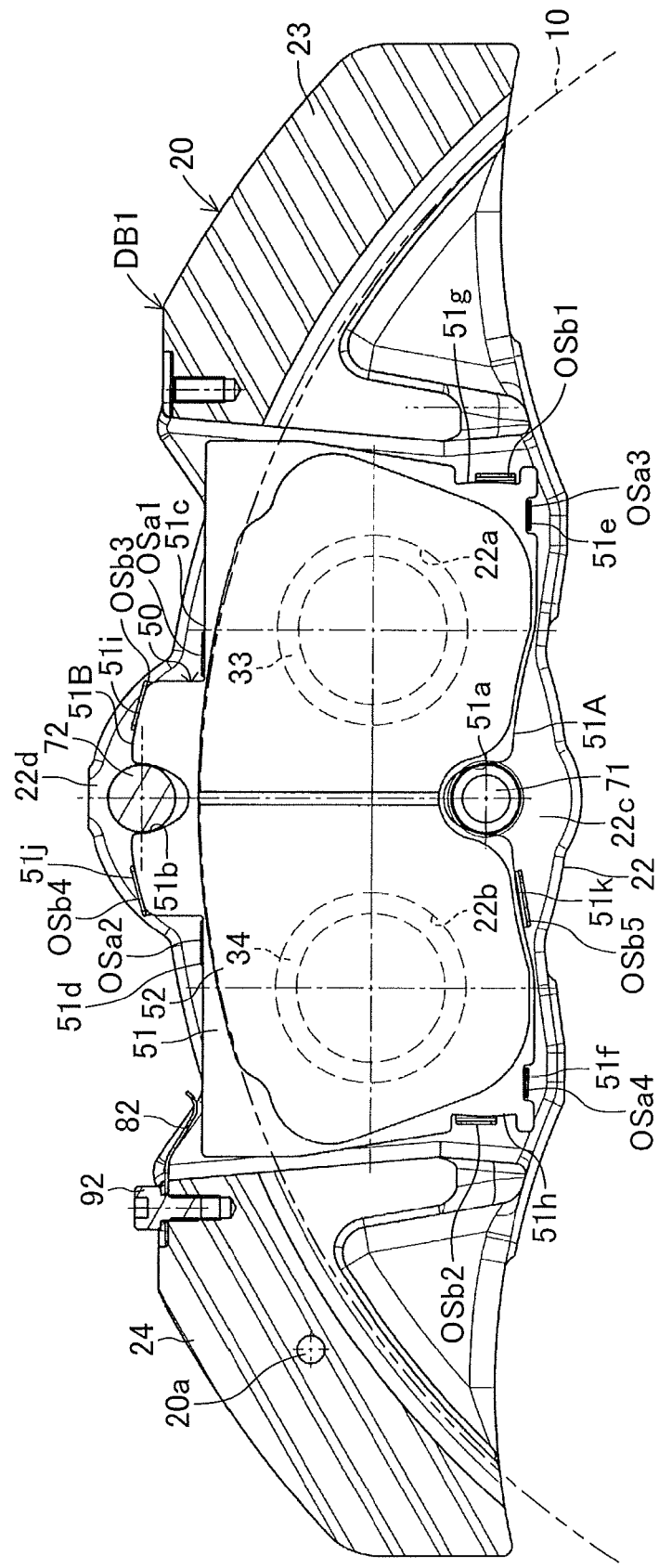
FIG. 3 is a sectional view taken along line B-B of FIG. 1.

As shown in FIGS. 2, 3, and 5, the pistons 31, 32, 33, and 34 are, as well known, fitted into the cylinders 21*a*, 21*b*, 22*a*, and 22*b*, respectively, liquid-tightly and slidably in the axial direction of the disc rotor 10, and are disposed in an opposed manner with the disc rotor 10 existing therebetween. When the disc rotor 10 is to be braked, hydraulic oil supplied from a brake master cylinder (not shown) into oil chambers Rc formed between the pistons 31, 32, 33, and 34 and the cylinders 21*a*, 21*b*, 22*a*, and 22*b*, respectively, presses the cylinders 21*a*, 21*b*, 22*a*, and 22*b*, whereby the cylinders 21*a*, 21*b*, 22*a*, and 22*b* can press the inner brake pad 40 and the outer brake pad 50 toward the disc rotor 10 in the axis direction of the disc rotor 10. The oil chambers Rc communicate with one another through an oil path 20*a* provided in the caliper 20.

Figure 6:
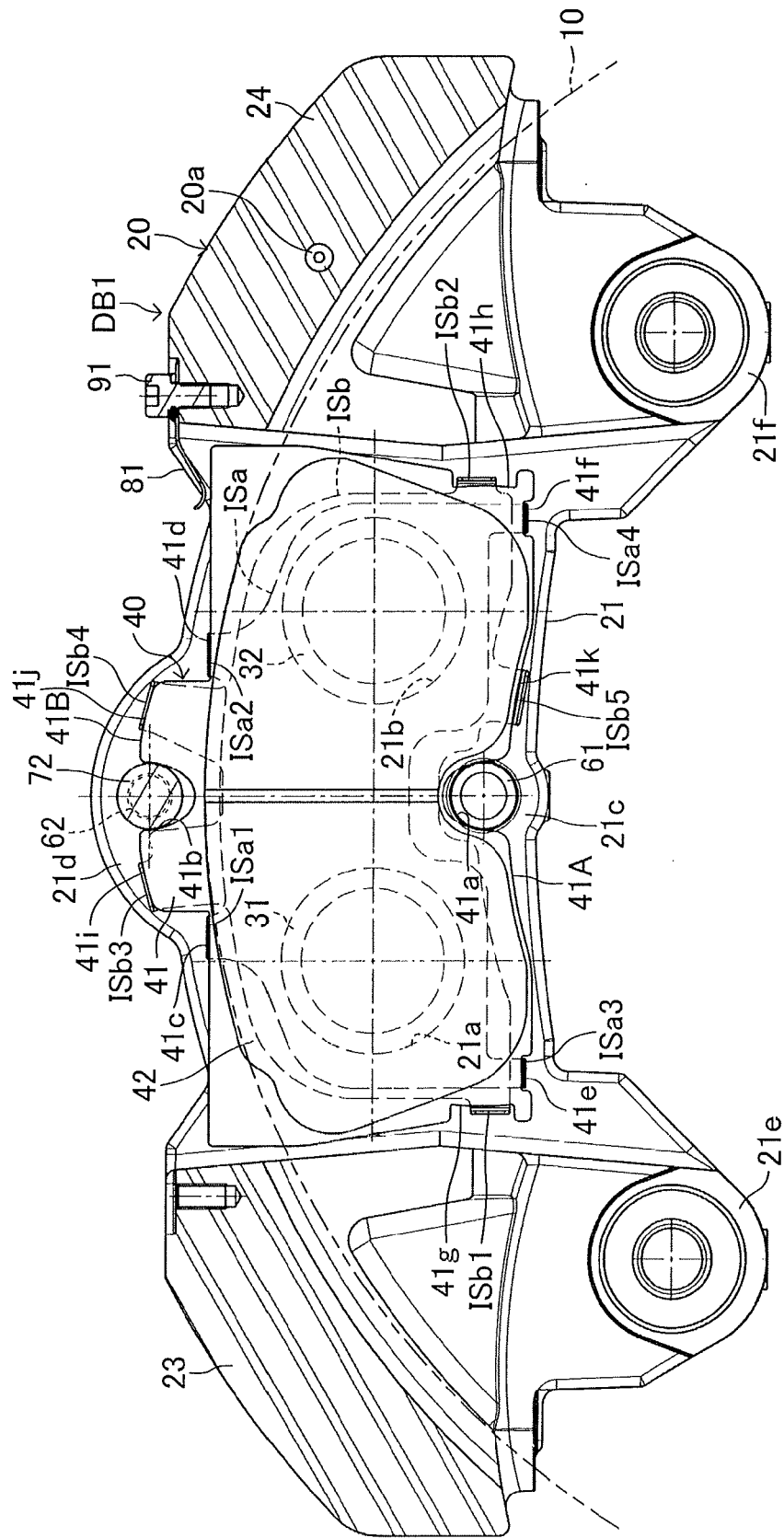
FIG. 6 is a sectional view equivalent to FIG. 2, additionally showing, by dashed lines, the outlines of inner and outer shims shown in FIG. 2.
Figure 7:
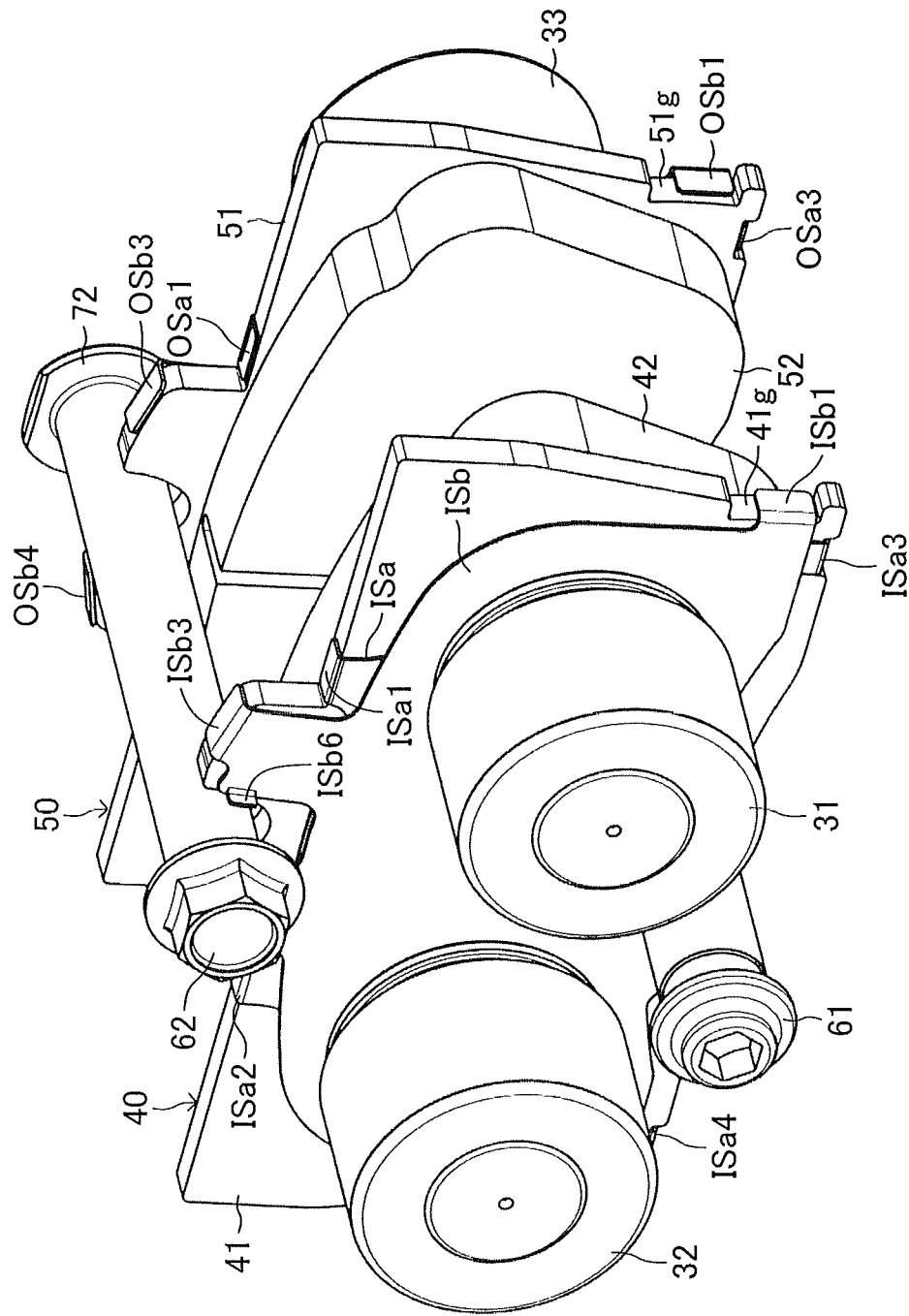
FIG. 7 is a perspective view showing the relation among a pair of brake pads, inner shims, and outer shims, a plurality of pistons, radially inner support shafts, radially outer support shafts, etc., in the disc brake apparatus shown in FIGS. 1 to 6.

As shown in FIGS. 2, 4, 5, and 6, the inner brake pad 40 is composed of the back plate 41 and the lining 42 fixedly attached to the back plate 41. Also, as shown in FIGS. 2, 4, and 6, the inner brake pad 40 is disposed on a side toward the inner housing portion 21 of the caliper 20; is attached to the inner radially-inner support shaft 61 and to the outer radially-outer support shaft 72 by means of the back plate 41; and is rotatable by a predetermined amount (a small amount) about the axis of the inner radially-inner support shaft 61.

As shown in FIGS. 2, 4, 5, and 6, the back plate 41 assumes the form of a flat plate; has a radially inner portion 41A extending radially inward, with respect to the radial direction of the disc rotor 10, beyond the lining 42 and having the V-shaped radially inner torque reception surface 41a; and has a radially outer portion 41B extending radially outward, with respect to the radial direction of the disc rotor 10, beyond the lining 42 and having the V-shaped radially outer torque reception surface 41b. The radially inner torque reception surface 41a is provided at a position corresponding to a radially inner, circumferentially central portion of the lining 42 with respect to the radial and circumferential directions of the disc rotor 10. The radially outer torque reception surface 41b is provided at a position corresponding to a radially outer, circumferentially central portion of the lining 42 with respect to the circumferential direction of the disc rotor 10.

Figure 8:
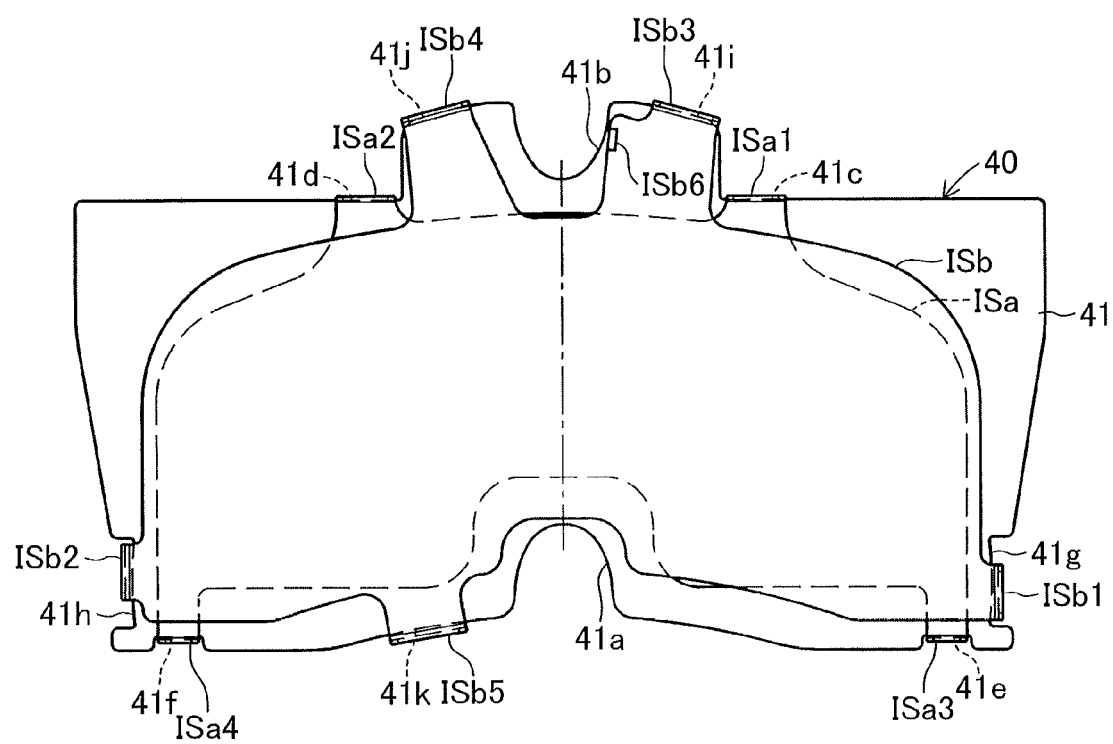
FIG. 8 is a rear view showing the relation among the left-hand brake pad shown in FIG. 7 and the inner and outer shims attached to the brake pad.
Figure 9:
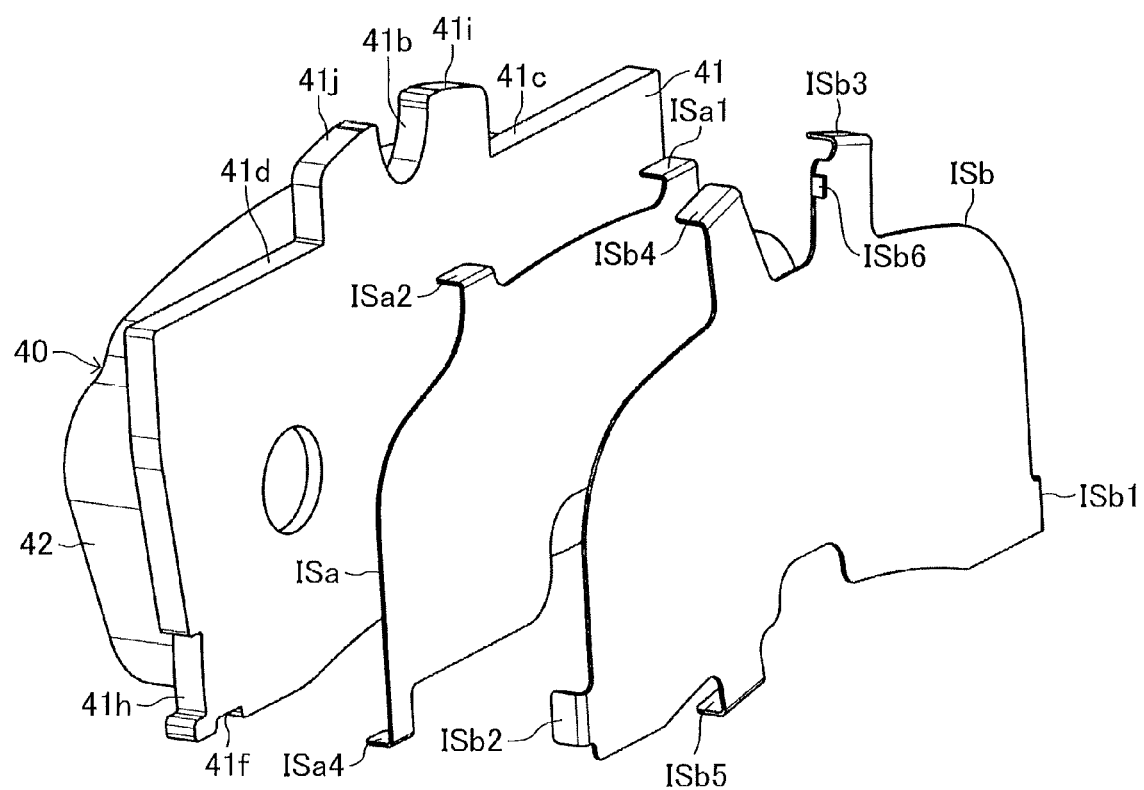
FIG. 9 is an exploded perspective view showing the brake pad, the inner shim, and the outer shim shown in FIG. 8.
Figure 10:
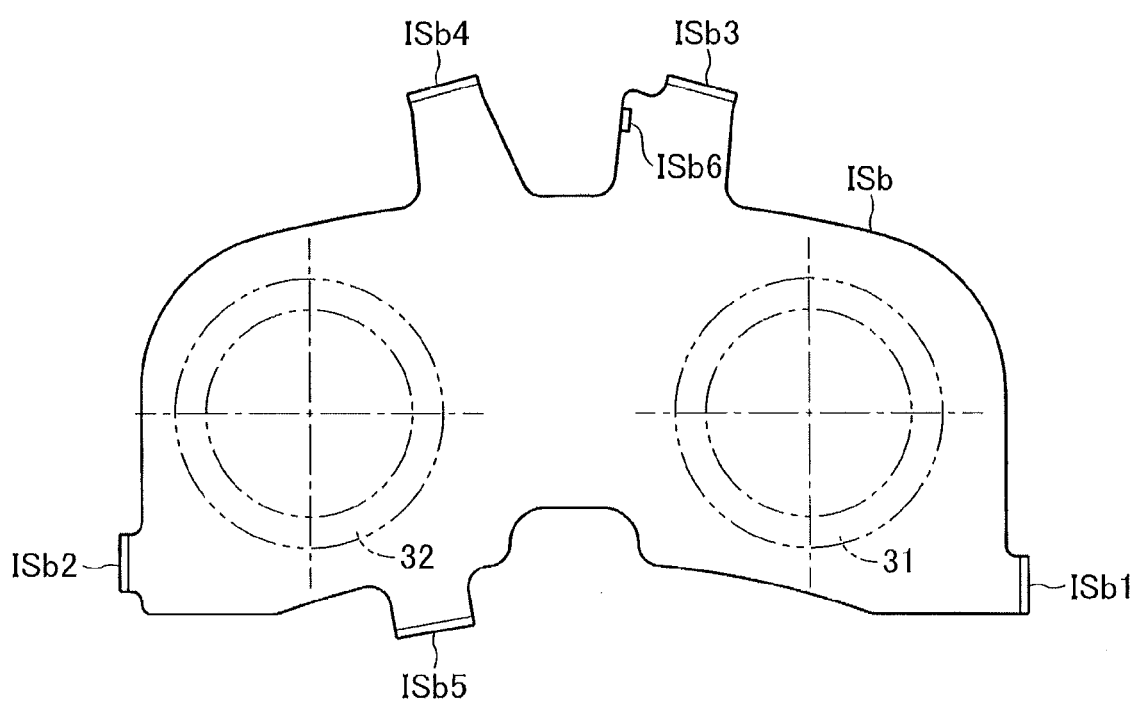
FIG. 10 is a rear view showing the outer shim shown in FIGS. 7 to 9.
Figure 11:
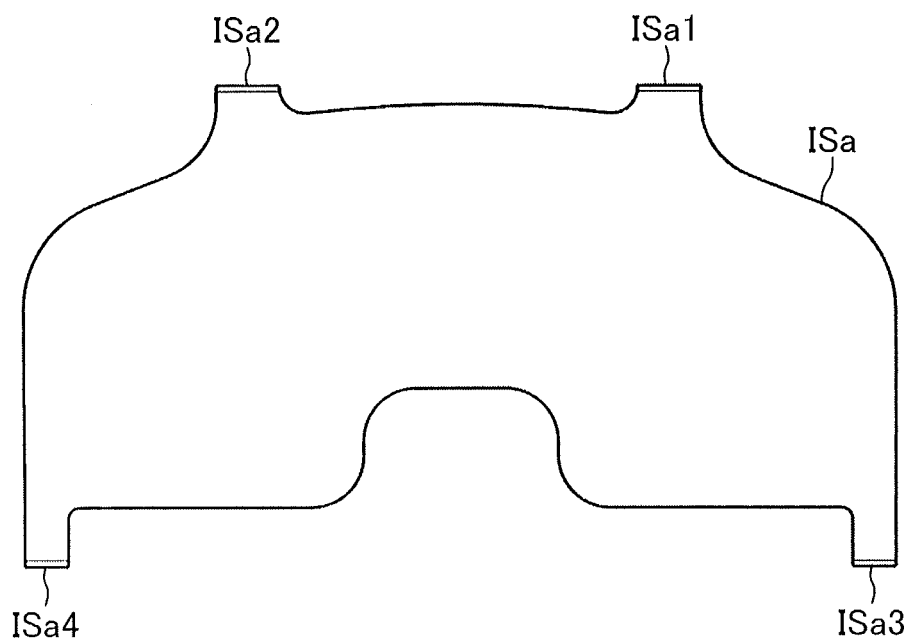
FIG. 11 is a rear view showing the inner shim shown in FIGS. 7 to 9.
Figure 12:
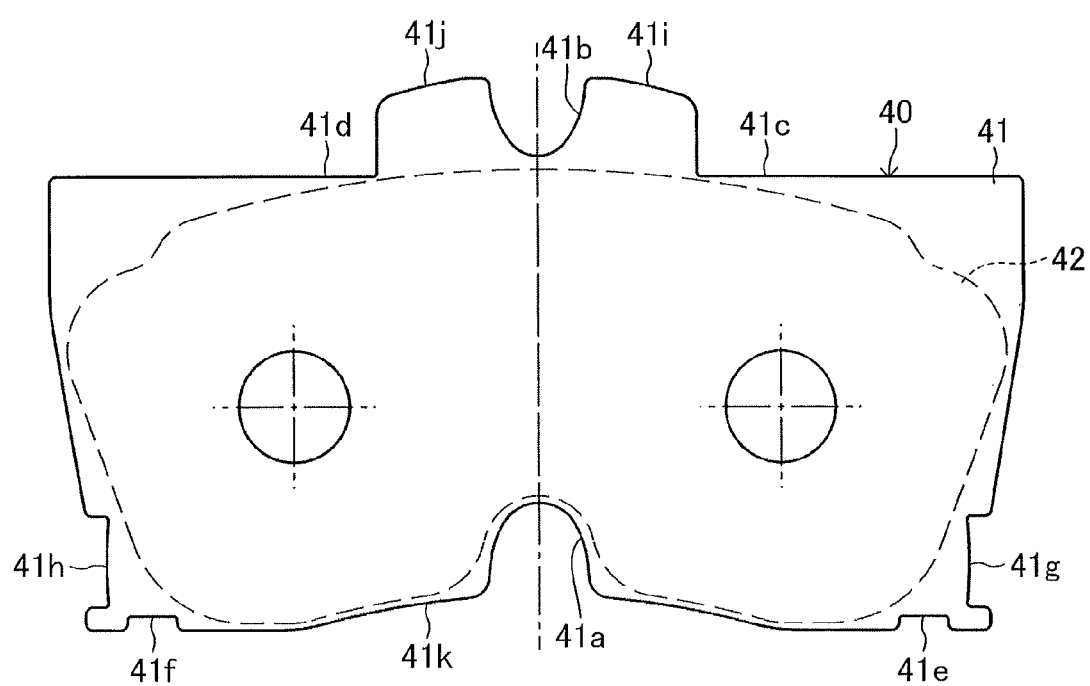
FIG. 12 is a rear view showing the brake pad shown in FIGS. 7 to 9.

As shown in FIGS. 8 and 12, the back plate 41 has a pair of radially outer engagement surfaces 41c and 41d and a pair of radially inner engagement surfaces 41e and 41f, these surfaces being engaged with the inner shim ISa, and has a leading-side engagement surface 41g, a trailing-side engagement surface 41h, a pair of radially outer engagement surfaces 41i and 41j, and a radially inner engagement surface 41k, these surfaces being engaged with the outer shim ISb. The pair of radially outer engagement surfaces 41c and 41d, the pair of radially inner engagement surfaces 41e and 41f, and the radially inner engagement surface 41k are formed rectilinearly. The leading-side engagement surface 41g, the trailing-side engagement surface 41h, and the pair of radially outer engagement surfaces 41i and 41j are formed into respective arc shapes about the axis of the inner radially-inner support shaft 61. The radially inner engagement surfaces 41e and 41f, the leading-side engagement surface 41g, and the trailing-side engagement surface 41h are formed by forming respective recesses in the back plate 41.

The lining 42 is formed into a substantially fanlike shape extending in the circumferential direction of the disc rotor 10 and is slidably pressed against the braking surface 10a of the disc rotor 10 as a result of the pistons 31 and 32 pressing the back plate 41 via the inner shim ISa and the outer shim ISb, thereby braking the disc rotor 10. In forward braking of the disc rotor 10 (in braking the disc rotor 10 when a vehicle is moving forward), a friction force acts on the lining 42 slidably pressed against the braking surface 10a of the disc rotor 10, in the circumferential direction from the leading side to the trailing side.

The inner shim ISa attached to the inner brake pad 40 is disposed between the back plate 41 and the pistons 31 and 32, on a side toward the back plate 41, and is attached to the back plate 41 in such a manner as to be movable unitarily with the back plate 41 in the radial direction of the disc rotor 10 and in the circumferential direction of the disc rotor 10 and to be movable relative to the back plate 41 in the axial direction of the disc rotor 10. The inner shim ISa has a pair of radially outer engagement tabs ISa1 and ISa2 and a pair of radially inner engagement tabs ISa3 and ISa4. The radially outer engagement tabs ISa1 and ISa2 are fixed to the radially outer engagement surfaces 41c and 41d, respectively, and the radially inner engagement tabs ISa3 and ISa4 are fixed to the radially inner engagement surfaces 41e and 41f, respectively.

The outer shim ISb attached to the inner brake pad 40 is disposed between the back plate 41 and the pistons 31 and 32, on a side toward the pistons 31 and 32, and is attached to the back plate 41 in such a manner as to be movable unitarily with the back plate 41 in the radial direction of the disc rotor 10 and in the circumferential direction of the disc rotor 10, to be movable relative to the back plate 41 in the axial direction of the disc rotor 10, and to be rotatable by a predetermined amount about the axis of the inner radially-inner support shaft 61 (see FIG. 2). The outer shim ISb has a leading-side engagement tab ISb1, a tailing-side engagement tab ISb2, a pair of radially outer engagement tabs ISb3 and ISb4, a radially inner engagement tab ISb5, and a stopper ISb6. The leading-side engagement tab ISb1 is slidably engaged with the leading-side engagement surface 41g; the trailing-side engagement tab ISb2 is slidably engaged with the trailing-side engagement surface 41h; and the radially outer engagement tabs ISb3 and ISb4 are slidably engaged with the radially outer engagement surfaces 41i and 41j, respectively. The radially inner engagement tab ISb5 is disengageably engaged with the radially inner engagement surface 41k.

Figure 13:
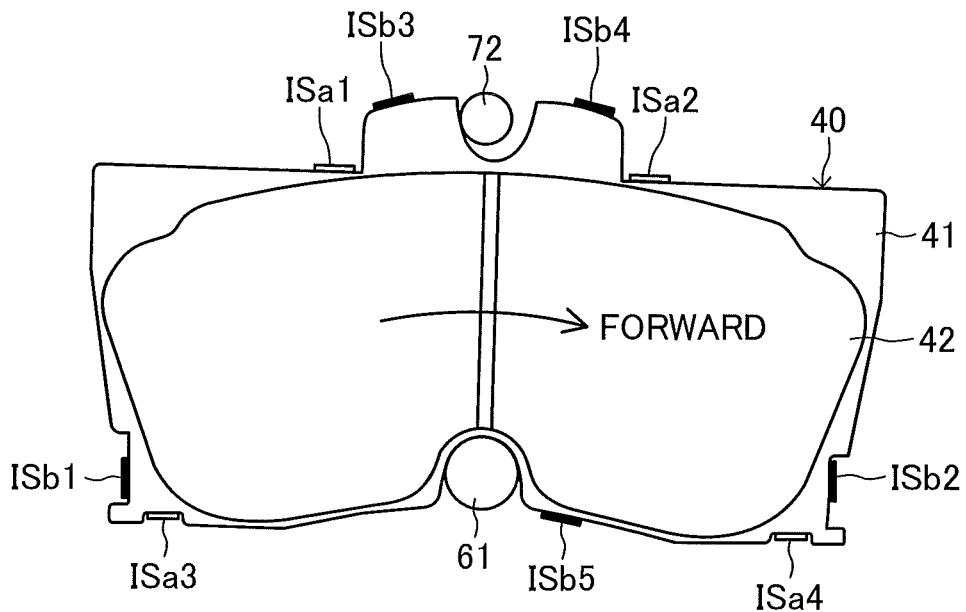
FIGS. 13(*a*) and 13(*b*) are operational explanatory views schematically showing behaviors of the brake pad, the inner shim, and the outer shim shown in FIG. 8 in braking.
Figure 13:
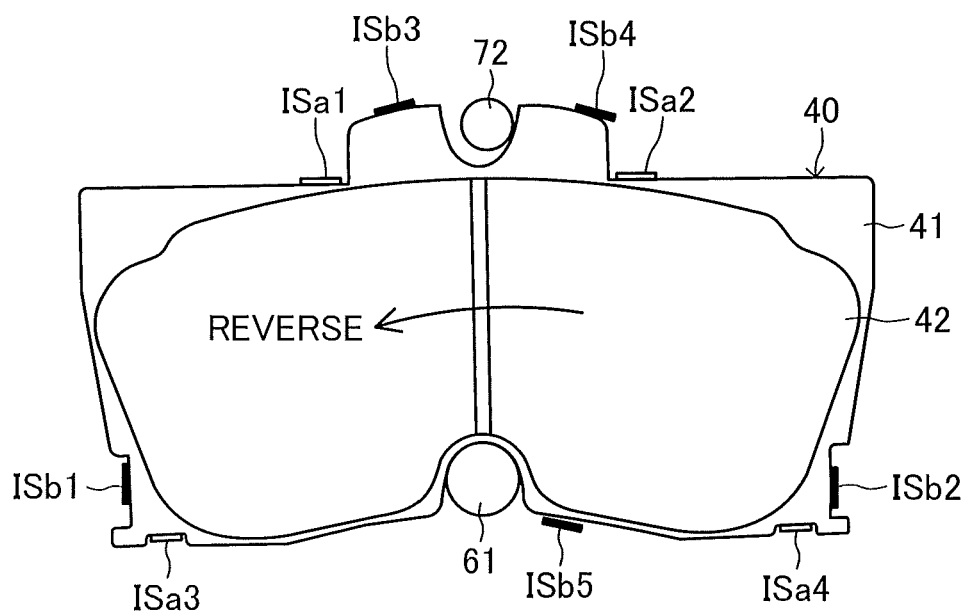

In a state shown in FIGS. 2 and 8 (a state in which the back plate 41 tilts toward the trailing side, similar to a state shown in FIG. 13(a)), in an engagement region between the leading-side engagement tab ISb1 and the leading-side engagement surface 41g, the leading-side engagement surface 41g can tilt along the leading-side engagement tab ISb1 by a predetermined amount radially inward with respect to the radial direction of the disc rotor 10, and, in an engagement region between the trailing-side engagement tab ISb2 and the trailing-side engagement surface 41h, the trailing-side engagement surface 41h can tilt along the trailing-side engagement tab ISb2 by a predetermined amount radially outward with respect to the radial direction of the disc rotor 10.

The stopper ISb6 can be engaged with and disengaged from the outer radially-outer support shaft 72, and, when the outer radially-outer support shaft 72 restrains the back plate 41 from tilting, toward the trailing side, on the inner radially-inner support shaft 61 and allows the back plate 41 to tilt, toward the leading side, on the inner radially-inner support shaft 61 (see FIG. 13(a)), the stopper ISb6 is engaged with the outer radially-outer support shaft 72 to restrain the outer shim ISb from tilting toward the trailing side about the inner radially-inner support shaft 61. The stopper ISb6 can be plane-engaged with the outer radially-outer support shaft 72.

The above-mentioned inner and outer shims ISa and ISb intervene, in contact with each other, between the back plate 41 and the pistons 31 and 32; the inner shim ISa is composed of a metal (stainless steel) plate and, for example, heat-resisting rubber disposed on a portion of contact with the back plate 41; and the outer shim ISb is composed of a metal (stainless steel) plate and, for example, heat-resisting rubber disposed on portions of contact with the pistons 31 and 32. Accordingly, a friction coefficient between the back plate 41 and the inner shim ISa and a friction coefficient between the outer shim ISb and the pistons 31 and 32 are higher than a friction coefficient between the inner shim ISa and the outer shim ISb.

As shown in FIGS. 3, 4, and 5, the outer brake pad 50 is composed of a back plate 51 and the lining 52 fixedly attached to the back plate 51. Also, as shown in FIGS. 3 and 4, the outer brake pad 50 is disposed on a side toward the outer housing portion 22 of the caliper 20; is attached to the outer radially-inner support shaft 71 and to the outer radially-outer support shaft 72 by means of the back plate 51; and is rotatable by a predetermined amount (a small amount) about the axis of the outer radially-inner support shaft 71.

As shown in FIGS. 3, 4, and 5, the back plate 51 assumes the form of a flat plate; has a radially inner portion 51A extending radially inward beyond the lining 52 with respect to the radial direction of the disc rotor 10, and having a V-shaped radially inner torque reception surface 51a; and has a radially outer portion 51B extending radially outward beyond the lining 52 with respect to the radial direction of the disc rotor 10, and having a V-shaped radially outer torque reception surface 51b. The radially inner torque reception surface 51a is provided at a position corresponding to a radially inner, circumferentially central portion of the lining 52 with respect to the radial and circumferential directions of the disc rotor 10. The radially outer torque reception surface 51b is provided at a position corresponding to a radially outer, circumferentially central portion of the lining 52 with respect to the radial and circumferential directions of the disc rotor 10.

Also, the back plate 51 is formed plane-symmetrically with the above-mentioned inner back plate 41; has a pair of radially outer engagement surfaces 51c and 51d and a pair of radially inner engagement surfaces 51e and 51f, these surfaces being engaged with the inner shim OSa, and has a leading-side engagement surface 51g, a trailing-side engagement surface 51h, a pair of radially outer engagement surfaces 51i and 51j, and a radially inner engagement surface 51k, these surfaces being engaged with the outer shim OSb. The pair of radially outer engagement surfaces 51c and 51d, the pair of radially inner engagement surfaces 51e and 51f, and the radially inner engagement surface 51k are formed rectilinearly. The leading-side engagement surface 51g, the trailing-side engagement surface 51h, and the pair of radially outer engagement surfaces 51i and 51j are formed into respective arc shapes about the axis of the outer radially-inner support shaft 71. The radially inner engagement surfaces 51e and 51f, the leading-side engagement surface 51g, and the trailing-side engagement surface 51h are formed by forming respective recesses in the back plate 51.

The lining 52 is formed into a substantially fanlike shape extending in the circumferential direction of the disc rotor 10 and is slidably pressed against the braking surface 10b of the disc rotor 10 as a result of the pistons 33 and 34 pressing the back plate 51 via the inner shim OSa and the outer shim OSb, thereby braking the disc rotor 10. In forward braking of the disc rotor 10 (in braking the disc rotor 10 when a vehicle is moving forward), a friction force acts on the lining 52 slidably pressed against the braking surface 10b of the disc rotor 10, in the circumferential direction from the leading side to the trailing side.

The inner shim OSa attached to the outer brake pad 50 is disposed between the back plate 51 and the pistons 33 and 34, on a side toward the back plate 51, and is attached to the back plate 51 in such a manner as to be movable unitarily with the back plate 51 in the radial direction of the disc rotor 10 and in the circumferential direction of the disc rotor 10 and to be movable relative to the back plate 51 in the axial direction of the disc rotor 10. The inner shim OSa has a pair of radially outer engagement tabs OSa1 and OSa2 and a pair of radially inner engagement tabs OSa3 and OSa4. The radially outer engagement tabs OSa1 and OSa2 are fixed to the radially outer engagement surfaces 51c and 51d, respectively, and the radially inner engagement tabs OSa3 and OSa4 are fixed to the radially inner engagement surfaces 51e and 51f, respectively.

The outer shim OSb attached to the outer brake pad 50 is disposed between the back plate 51 and the pistons 33 and 34, on a side toward the pistons 33 and 34, and is attached to the back plate 51 in such a manner as to be movable unitarily with the back plate 51 in the radial direction of the disc rotor 10 and in the circumferential direction of the disc rotor 10, to be movable relative to the back plate 51 in the axial direction of the disc rotor 10, and to be rotatable by a predetermined amount about the axis of the outer radially-inner support shaft 71 (see FIG. 3). The outer shim OSb has a leading-side engagement tab OSb1, a tailing-side engagement tab OSb2, a pair of radially outer engagement tabs OSb3 and OSb4, a radially inner engagement tab OSb5, and a stopper (not shown). The leading-side engagement tab OSb1 is slidably engaged with the leading-side engagement surface 51g; the trailing-side engagement tab OSb2 is slidably engaged with the trailing-side engagement surface 51h; and the radially outer engagement tabs OSb3 and OSb4 are slidably engaged with the radially outer engagement surfaces 51i and 51j, respectively. The radially inner engagement tab OSb5 is disengageably engaged with the radially inner engagement surface 51k.

In a state shown in FIG. 3 (a state in which the back plate 51 tilts toward the trailing side), in an engagement region between the leading-side engagement tab OSb1 and the leading-side engagement surface 51g, the leading-side engagement surface 51g can tilt along the leading-side engagement tab OSb1 by a predetermined amount radially inward with respect to the radial direction of the disc rotor 10, and, in an engagement region between the trailing-side engagement tab OSb2 and the trailing-side engagement surface 51h, the trailing-side engagement surface 51h can tilt along the trailing-side engagement tab OSb2 by a predetermined amount radially outward with respect to the radial direction of the disc rotor 10.

The stopper (not shown) can be engaged with and disengaged from the outer radially-outer support shaft 72, and, when the outer radially-outer support shaft 72 restrains the back plate 51 from tilting, toward the trailing side, on the outer radially-inner support shaft 71 and allows the back plate 51 to tilt, toward the leading side, on the outer radially-inner support shaft 71, the stopper is engaged with the outer radially-outer support shaft 72 to restrain the outer shim OSb from tilting toward the trailing side about the outer radially-inner support shaft 71. The stopper can be plane-engaged with the outer radially-outer support shaft 72.

The above-mentioned inner and outer shims OSa and OSb intervene, in contact with each other, between the back plate 51 and the pistons 33 and 34; the inner shim OSa is composed of a metal (stainless steel) plate and, for example, heat-resisting rubber disposed on a portion of contact with the back plate 51; and the outer shim OSb is composed of a metal (stainless steel) plate and, for example, heat-resisting rubber disposed on portions of contact with the pistons 33 and 34. Accordingly, a friction coefficient between the back plate 51 and the inner shim OSa and a friction coefficient between the outer shim OSb and the pistons 33 and 34 are higher than a friction coefficient between the inner shim OSa and the outer shim OSb.

As shown in FIG. 4, the inner radially-inner support shaft 61 and the outer radially-inner support shaft 71 are threadingly engaged with the support portions 21c and 22c, respectively, of the caliper 20 and extend in the axial direction of the disc rotor 10. The outer radially-outer support shaft 72 is inserted through the support portions 21d and 22d of the caliper 20, and an externally threaded portion 62a provided at a distal end portion of the inner radially-outer support shaft 62 is threadingly engaged with an internally threaded portion 72a provided at a distal end portion of the outer radially-outer support shaft 72, whereby the outer radially-outer support shaft 72 is connected to the inner radially-outer support shaft 62.

The plate spring 81 is attached to the support portion 21c of the caliper 20 by use of a screw 91 and biases the outer periphery of a trailing-side portion of the back plate 41 radially inward with respect to the radial direction of the disc rotor 10 such that a leading-side portion of the inner brake pad 40 is located radially outward of a trailing-side portion of the inner brake pad 40 with respect to the radial direction of the disc rotor 10. The plate spring 82 is attached to the support portion 22c of the caliper 20 by use of a screw 92 and biases the outer periphery of a trailing-side portion of the back plate 51 radially inward with respect to the radial direction of the disc rotor 10 such that a leading-side portion of the outer brake pad 50 is located radially outward of a trailing-side portion of the outer brake pad 40 with respect to the radial direction of the disc rotor 10.

Thus, the back plate 41 of the inner brake pad 40 is engaged with the inner radially-inner support shaft 61, with no gap therebetween, at two locations; specifically, at a location between one o'clock and two o'clock and at a location between 10 o'clock and 11 o'clock on the radially inner torque reception surface 41a as viewed on FIG. 2, and engaged with the outer radially-outer support shaft 72, with no gap therebetween, at one location; specifically at a location between seven o'clock and eight o'clock on the radially outer torque reception surface 41b as viewed on FIG. 2.

The back plate 51 of the outer brake pad 50 is engaged with the outer radially-inner support shaft 71, with no gap therebetween, at two locations; specifically, at a location between one o'clock and two o'clock and at a location between 10 o'clock and 11 o'clock on the radially inner torque reception surface 51a as viewed on FIG. 3, and engaged with the outer radially-outer support shaft 72, with no gap therebetween, at one location; specifically at a location between four o'clock and five o'clock on the radially outer torque reception surface 51b as viewed on FIG. 3.

In the embodiment configured as mentioned above, when, in association with a brake pedal (not shown) being stepped on, hydraulic oil is supplied to the oil chambers Rc from a brake master cylinder (not shown), the pistons 31, 32, 33, and 34 are pressed toward the disc rotor 10, thereby pressing the inner brake pad 40 and the outer brake pad 50 toward the disc rotor 10. By this operation, the linings 42 and 52 of the inner brake pad 40 and the outer brake pad 50, respectively, are slidably pressed against the braking surfaces 10a and 10b, respectively, of the disc rotor 10, thereby braking the disc rotor 10. When the brake pedal (not shown) is released, and hydraulic oil is discharged from the oil chambers Rc toward the brake master cylinder (not shown), the above-mentioned braking of the disc rotor 10 is canceled.

In the embodiment configured as mentioned above, torque associated with braking of the disc rotor 10 (forward braking) is received at three locations on the brake pad 40 (50); namely, at two engagement locations between the radially inner support shaft 61 (71) and the V-shaped radially inner torque reception surface 41a (51a) of the brake pad 40 (50) and at one engagement location between the radially outer support shaft 72 and the V-shaped radially outer torque reception surface 41b (51b) of the brake pad 40 (50); therefore, as compared with the case where torque associated with braking is received by an unstable plane (e.g., as in the case of the above-mentioned disc brake apparatus of Patent Document 1), the behavior of the brake pad 40 (50) is stable. Accordingly, the production of brake noise associated with an unstable behavior of the brake pads 40 and 50 in braking can be restrained. Also, as compared with the case where torque associated with braking is received by an unstable plane, the area of locations (the area of machining) which receive the torque can be reduced, whereby the machining cost can be reduced.

Also, in the present embodiment, the locations of receiving torque associated with braking correspond to radially inner, circumferentially central portions of the linings 42 and 52 with respect to the radial and circumferential directions of the disc rotor 10, and to radially outer, circumferentially central portions of the linings 42 and 52 with respect to the radial and circumferential directions of the disc rotor 10; therefore, the locations are not a great distance away from the circumferential end surfaces of the linings 42 and 52 with respect to the circumferential direction of the disc rotor 10 (i.e., moment arms are short). Therefore, as compared with the disc brake apparatus of Patent Document 1 mentioned above, the enfolding moments of the brake pads 40 and 50 generated in braking can be reduced; the distribution of surface pressure on each of the linings 42 and 52 against the disc rotor 10 can be uniform; and uneven wear of the linings 42 and 52 in the circumferential direction of the rotor disc 10 can be restrained.

Also, in the present embodiment, the plate springs 81 and 82 bias the trailing-side portions of the back plates 41 and 51, respectively, radially inward with respect to the radial direction of the disc rotor 10 such that the leading-side portions of the brake pads 40 and 50 are located radially outward of the trailing-side portions of the brake pads 40 and 50, respectively, with respect to the radial direction of the disc rotor 10. Thus, before braking, biasing forces of the plate springs 81 and 82 establish an engaged state (a contact state) at the three locations which receive torque associated with braking. Therefore, when the disc rotor 10 is not braked, there can be restrained play of the brake pads 40 and 50 on the support shafts 61, 62, 71, and 72 attached to the caliper 20, and also, in braking, for example, at an early stage of disc rotor braking when a vehicle is moving forward (when the disc rotor 10 is rotating forward), the back plates 41 and 51 of the brake pads 40 and 50 do not come into contact with the radially outer support shafts 62 and 72, thereby restraining (preventing) the generation of clonk noise (hitting noise as a result of the back plates 41 and 51 coming into contact with the radially outer support shafts 62 and 72).

In reverse braking of the disc rotor 10, at an early stage of the braking, the back plates 41 and 51 of the brake pads 40 and 50 come into contact with the radially outer support shafts 72, thereby generating clonk noise; however, in the subsequent course of braking, an operation similar to that in forward braking of the disc rotor 10 is obtained. Therefore, even in reverse braking of the disc rotor 10 (in braking the disc rotor 10 when a vehicle is reversing), actions and effects similar to those yielded in forward braking of the disc rotor 10 (in braking the disc rotor 10 when a vehicle is moving forward) are yielded.

In the embodiment configured as mentioned above, the inner shims ISa and OSa are attached to the respective back plates 41 and 51 in such a manner as to be movable unitarily with the back plates 41 and 51 in the radial direction of the disc rotor 10 and in the circumferential direction of the disc rotor 10, and to be movable relative to the back plates 41 and 51 in the axial direction of the disc rotor 10; and the outer shims ISb and OSb are attached to the respective back plates 41 and 51 in such a manner as to be movable unitarily with the back plates 41 and 51 in the radial direction of the disc rotor 10 and in the circumferential direction of the disc rotor 10, to be movable relative to the back plates 41 and 51 in the axial direction of the disc rotor 10, and to be rotatable by a predetermined amount about the axis of the radially inner support shaft 61 and 71, respectively. Therefore, in a nonbraking condition, the movement of the inner shims ISa and OSa and the outer shims ISb and OSb relative to the back plates 41 and 51 (shim vibration) can be restrained; accordingly, rattle noise caused by shim vibration can be restrained.

In the embodiment configured as mentioned above, when, in braking, the back plates 41 and 51 (brake pads) tilt on the radially inner support shafts 61 and 71, respectively, the outer shims ISb and OSb (whose movements are restricted by the pistons 31 and 32 and the pistons 33 and 34, respectively) do not hinder the tilting of the respective back plates 41 and 51. Therefore, in braking, a predetermined relative movement can be established between the inner shims ISa and OSa and the outer shims ISb and OSb, and a brake-noise-preventing function as effected by the relative movement between the inner shims ISa and OSa and the outer shims ISb and OSb can be effectively exhibited.

In the embodiment configured as mentioned above, the outer shims ISb and OSb have respective stoppers (ISb6) which can be engaged with and disengaged from the radially outer support shaft 72, and, when the radially outer support shaft 72 restrains the back plates 41 and 51 from tilting, toward the trailing side, on the respective radially inner support shafts 61 and 71 and allows the back plates 41 and 51 to tilt, toward the leading side, on the respective radially inner support shafts 61 and 71, the stoppers (ISb6) are engaged with the radially outer support shaft 72 to restrain the outer shims ISb and OSb from tilting toward the trailing side about the radially inner support shafts 61 and 71. Thus, external force, if any, can be prevented from causing the outer shims ISb and OSb to tilt toward the trailing side about the respective radially inner support shafts 61 and 71. Therefore, as shown in FIG. 13(a), the outer shims ISb and OSb can be maintained in a predetermined condition relative to the respective back plates 41 and 51, thereby ensuring a smooth movement of the back plates 41 and 51 when the back plates 41 and 51 tilt, toward the leading side, on the respective radially inner support shafts 61 and 71 (see FIG. 13(b)).

Since the stoppers (ISb6) are plane-engaged with the radially outer support shaft 72, the stoppers (ISb6) can be restrained from damaging the radially outer support shaft 72. Therefore, a smooth movement of the back plates 41 and 51 along the radially outer support shaft 72 (a smooth movement of the brake pads in the axial direction of the disc rotor 10) can be ensured over a long period of time.

In the embodiment described above, the leading-side engagement tabs ISb1 and OSb1, the trailing-side engagement tabs ISb2 and OSb2, and the radially outer engagement tabs ISb3, ISb4, OSb3, and OSb4 of the outer shims ISb and OSb are formed into respective arc shapes about the axes of the radially inner support shafts 61 and 71; however, these engagement tabs can be formed rectilinearly. Also, in the embodiment described above, each of the outer shims ISb and OSb has a pair of radially outer engagement tabs; however, either one of the paired radially outer engagement tabs can be eliminated.

Figure 14:
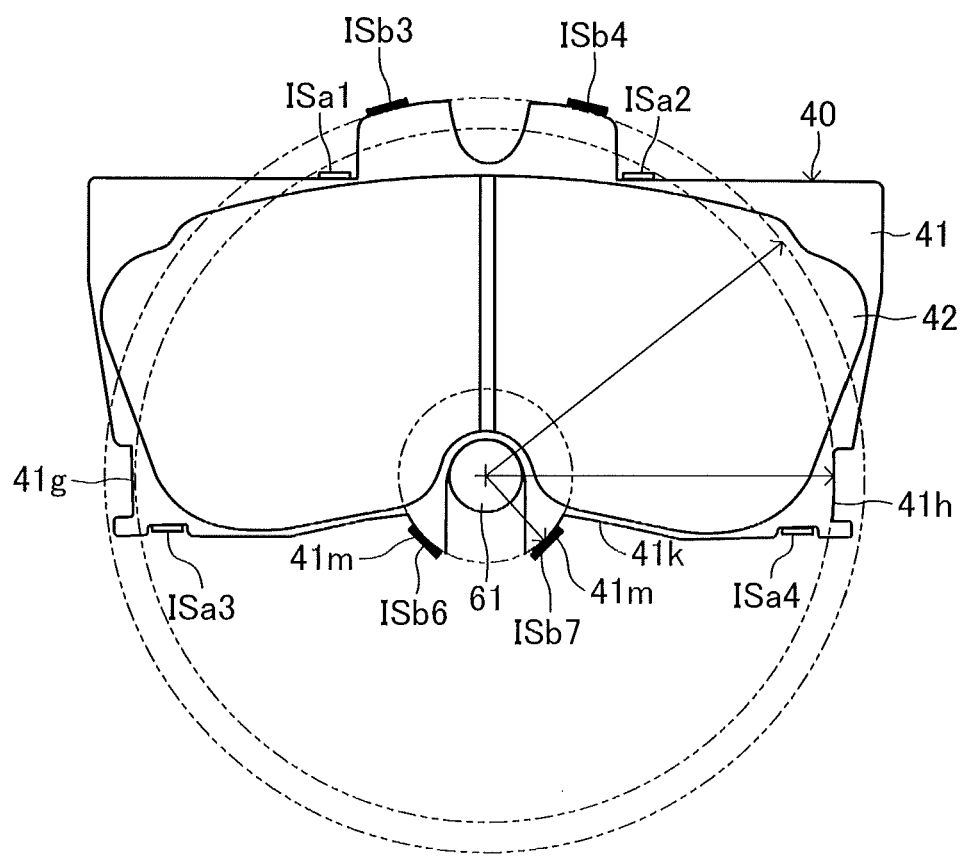
FIG. 14 is a front view schematically showing an embodiment in which a pair of radially outer engagement surfaces and a pair of radially inner engagement surfaces formed on a back plate are formed into respective arc shapes about the axis of a radially inner support shaft.

In the embodiment described above, each of the outer shims ISb and OSb has five engagement tabs; however, for example, when the back plate 41 can be formed into the shape shown in FIG. 14 (radially inner engagement surfaces 41m and 41n, each having an arc shape about the axis of the radially inner support shaft 61, are formed on opposite sides of the radially inner support shaft 61), a pair of radially inner engagement tabs ISb6 and ISb7 to be engaged with the radially inner engagement surfaces 41m and 41n, respectively, can be employed in place of the three engagement tabs of the above embodiment; namely, the leading-side engagement tab ISb1, the trailing-side engagement tab ISb2, and the radially inner engagement tab ISb5. In this case, the leading-side engagement surface 41g, the trailing-side engagement surface 41h, and the radially inner engagement surface 41k of the back plate 41 are unnecessary.

In the embodiment described above, the inner brake pad 40 and the outer brake pad 50 are biased radially inward with respect to the radial direction of the disc rotor 10 by use of the plate springs 81 and 82 such that leading-side portions of the inner and outer brake pads 40 and 50 are located radially outward of trailing-side portions of the inner and outer brake pads 40 and 50 with respect to the radial direction of the disc rotor 10; however, the biasing members are not limited to the plate springs, but may be, for example, torsion bars, and can be modified as appropriate.

In the embodiment described above, the inner radially-outer support shaft 62 and the outer radially-outer support shaft 72 are threadingly connected so as to be united together; however, these members can be independent of each other.

In the embodiment described above, the caliper 20 includes the inner housing portion 21 and the outer housing portion 22 which face each other in such a manner as to straddle a partial circumference of the disc rotor 10, and the pair of connection portions 23 and 24 for integrally connecting the inner and outer housing portions 21 and 22; however, the caliper can be configured such that an inner housing and an outer housing are provided as two independent members disposed in the axial direction of the disc rotor and are connected together by means of a plurality of connection bolts.

In the embodiment described above, each of the inner housing portion 21 and the outer housing portion 22 of the caliper 20 has two cylinders; however, the number of cylinders formed in each of the inner housing portion and the outer housing portion of the caliper and the number of pistons fitted into the respective cylinders can be one or three or more than three.

The invention claimed is:

1. A disc brake apparatus which comprises a disc rotor attached to a rotating member and rotating unitarily with the rotating member, a caliper attached to a support body in such a manner as to straddle a partial circumference of the disc rotor, a pair of brake pads disposed in such a manner as to be able to nip the disc rotor, and supported via a support shaft by the caliper in such a manner as to be movable in an axial direction of the disc rotor, and pistons attached to the caliper and adapted to press the brake pads toward the disc rotor, and which is configured such that the pistons press back plates of the brake pads, whereby linings of the brake pads are slidably pressed against braking surfaces of the disc rotor, thereby braking the disc rotor, V-shaped radially inner torque reception surfaces being located at positions corresponding to radially inner, circumferentially central portions of the linings with respect to radial and circumferential directions of the disc rotor, radially outer torque reception surfaces being located at positions corresponding to radially outer, circumferentially intermediate portions of the linings with respect to the radial and circumferential directions of the disc rotor, wherein the brake pads are biased inward with respect to a radial direction of the disc rotor by biasing members, the support shaft is composed of a single radially inner support shaft provided unitarily with the caliper and engaged with the V-shaped radially inner torque reception surfaces of the back plates at two locations on each of the V-shaped radially inner torque reception surfaces, and a radially outer support shaft provided unitarily with the caliper and engaged with the radially outer torque reception surfaces of the back plates at one location on each of the radially outer torque reception surfaces, and the brake pads are attached to the radially inner support shaft in such a manner as to be rotatable by a predetermined amount about an axis of the radially inner support shaft, an inner shim and an outer shim intervene between each of the back plates and each of the pistons in such a manner that the inner and outer shims are disposed toward the back plate and the piston, respectively, and a friction coefficient between the back plate and the inner shim and a friction coefficient between the piston and the outer shim are higher than a friction coefficient between the inner shim and the outer shim, the inner shim is attached to the back plate in such a manner as to be movable unitarily with the back plate in the radial direction of the disc rotor and in the circumferential direction of the disc rotor, and to be movable relative to the back plate in the axial direction of the disc rotor, and the outer shim is attached to the back plate in such a manner as to be movable unitarily with the back plate in the radial direction of the disc rotor and in the circumferential direction of the disc rotor, to be movable relative to the back plate in the axial direction of the disc rotor, and to be rotatable by a predetermined amount about the axis of the radially inner support shaft.

2. A disc brake apparatus according to claim 1, wherein:
the outer shim has a leading-side engagement tab to be engaged with a leading-side engagement surface formed on a leading-side end surface, located on a leading side with respect to the circumferential direction of the disc rotor, of the back plate, a trailing-side engagement tab to be engaged with a trailing-side engagement surface formed on a trailing-side end surface, located on a trailing side with respect to the circumferential direction of the disc rotor, of the back plate, a radially outer engagement tab to be engaged with a radially outer engagement surface formed on a radially outer end surface, located on a radially outer side with respect to the radial direction of the disc rotor, of the back plate, and a radially inner engagement tab to be engaged with a radially inner engagement surface formed on a radially inner end surface, located on a radially inner side with respect to the radial direction of the disc rotor, of the back plate;

the leading-side engagement surface, the trailing-side engagement surface, and the radially outer engagement surface of the back plate are formed into respective arc shapes about the axis of the radially inner support shaft; and in a state in which the radially outer support shaft restrains the back plate from tilting, toward the trailing side, on the radially inner support shaft and allows the back plate to tilt, toward the leading side, on the radially inner support shaft, the radially inner engagement tab of the outer shim is disengageably engaged with the radially inner engagement surface of the back plate.

3. A disc brake apparatus according to claim 1, wherein the outer shim has a pair of radially outer engagement tabs to be engaged with a pair of radially outer engagement surfaces formed on the back plate on opposite sides, with respect to the circumferential direction of the disc rotor, of the radially outer torque reception surface; a pair of radially inner engagement tabs to be engaged with a pair of radially inner engagement surfaces formed on the back plate on opposite sides, with respect to the circumferential direction of the disc rotor, of the radially inner torque reception surface; and the pair of radially outer engagement surfaces and the pair of radially inner engagement surfaces formed on the back plate are formed into respective arc shapes about the axis of the radially inner support shaft.

4. A disc brake apparatus according to claim 2 or 3, wherein the outer shim has a stopper which can be engaged with and disengaged from the radially outer support shaft, and, when the radially outer support shaft restrains the back plate from tilting, toward the trailing side, on the radially inner support shaft and allows the back plate to tilt, toward the leading side, on the radially inner support shaft, the stopper is engaged with the radially outer support shaft to restrain the outer shim from tilting toward the trailing side about the radially inner support shaft.

5. A disc brake apparatus according to claim 4, wherein the stopper is engaged with the radially outer support shaft.

6. A disc brake apparatus which comprises a disc rotor attached to a rotating member and rotating unitarily with the rotating member, a caliper attached to a support body in such a manner as to straddle a partial circumference of the disc rotor, a pair of brake pads disposed in such a manner as to be able to nip the disc rotor, and supported via a support shaft by the caliper in such a manner as to be movable in an axial direction of the disc rotor, and pistons attached to the caliper and adapted to press the brake pads toward the disc rotor, and which is configured such that the pistons press back plates of the brake pads, whereby linings of the brake pads are slidably pressed against braking surfaces of the disc rotor, thereby braking the disc rotor, wherein the brake pads are biased inward with respect to a radial direction of the disc rotor by biasing members, the support shaft is composed of a single radially inner support shaft provided unitarily with the caliper and contacts V-shaped radially inner torque reception surfaces of the back plates at two locations on each of the V-shaped radially inner torque reception surfaces, the V-shaped radially inner torque reception surfaces being located at positions corresponding to radially inner, circumferentially central portions of the linings with respect to radial and circumferential directions of the disc rotor, and a radially outer support shaft provided unitarily with the caliper and contacts radially outer torque reception surfaces of the back plates at one location on each of the radially outer torque reception surfaces, the radially outer torque reception surfaces being located at positions corresponding to radially outer, circumferentially intermediate portions of the linings with respect to the radial and circumferential directions of the disc rotor, and the brake pads are attached to the radially inner support shaft in such a manner as to be rotatable by a predetermined amount about an axis of the radially inner support shaft, an inner shim and an outer shim intervene between each of the back plates and each of the pistons in such a manner that the inner and outer shims are disposed toward the back plate and the piston, respectively, and a friction coefficient between the back plate and the inner shim and a friction coefficient between the piston and the outer shim are higher than a friction coefficient between the inner shim and the outer shim, the inner shim is attached to the back plate in such a manner as to be movable unitarily with the back plate in the radial direction of the disc rotor and in the circumferential direction of the disc rotor, and to be movable relative to the back plate in the axial direction of the disc rotor, and the outer shim is attached to the back plate in such a manner as to be movable unitarily with the back plate in the radial direction of the disc rotor and in the circumferential direction of the disc rotor, to be movable relative to the back plate in the axial direction of the disc rotor, and to be rotatable by a predetermined amount about the axis of the radially inner support shaft.

* * * * *